US011425890B2

(12) United States Patent
Spanovic et al.

(10) Patent No.: US 11,425,890 B2
(45) Date of Patent: Aug. 30, 2022

(54) RESTRAINT ASSEMBLY FOR AN ANIMAL

(71) Applicant: K-9 MD Incorporated, Toronto (CA)

(72) Inventors: Gregory Alexander Spanovic, Toronto (CA); Julia Catharine Butler, Toronto (CA)

(73) Assignee: K-9 MD INCORPORATED, Toronto (CA)

( * ) Notice: Subject to any disclaimer, the term of this patent is extended or adjusted under 35 U.S.C. 154(b) by 0 days.

(21) Appl. No.: 16/878,493

(22) Filed: May 19, 2020

(65) Prior Publication Data

US 2020/0344979 A1  Nov. 5, 2020

Related U.S. Application Data

(63) Continuation-in-part of application No. 15/485,006, filed on Apr. 11, 2017, now Pat. No. 10,653,113.

(60) Provisional application No. 62/912,354, filed on Oct. 8, 2019, provisional application No. 62/320,798, filed on Apr. 11, 2016.

(51) Int. Cl.
*A01K 27/00* (2006.01)

(52) U.S. Cl.
CPC ................. *A01K 27/002* (2013.01)

(58) Field of Classification Search
CPC .... A01K 13/006; A01K 27/002; A01K 23/00; A01K 15/00; A01K 15/04; A01K 27/00
See application file for complete search history.

(56) References Cited

U.S. PATENT DOCUMENTS

| 2,534,727 | A | * | 12/1950 | Moyle | A01K 15/04 54/71 |
| 5,845,606 | A | * | 12/1998 | Hartman | A01K 13/00 119/856 |
| 7,284,504 | B1 | * | 10/2007 | Purschwitz, Jr. | A01K 1/0263 119/792 |
| 8,336,506 | B2 | * | 12/2012 | Zimmerman | A01K 1/0263 119/856 |
| 9,320,260 | B2 | * | 4/2016 | Zimmerman | A01K 27/003 |
| 9,955,668 | B2 | * | 5/2018 | Zimmerman | A01K 27/002 |
| 2007/0044735 | A1 | * | 3/2007 | Zimmerman | A01K 27/002 119/856 |
| 2011/0017151 | A1 | * | 1/2011 | Simoni | A01K 13/006 119/850 |
| 2014/0174379 | A1 | * | 6/2014 | Kissel, Jr. | A01K 13/007 119/850 |
| 2015/0020752 | A1 | * | 1/2015 | Zimmerman | A01K 1/0263 119/792 |

* cited by examiner

*Primary Examiner* — Kristen C Hayes
(74) *Attorney, Agent, or Firm* — The Watson IP Group, PLC; Jovan N. Jovanovic

(57) ABSTRACT

A restraint assembly for an animal having a front anchor member, a rear anchor member and a coupling assembly. The front anchor member is configured to be secured to an animal through an interaction with at least one of a neck, a first front leg, and second front leg thereof. The rear anchor member is configured to be secured to an animal through interaction with at least one of a tail, a first rear leg, and a second rear leg thereof. The coupling assembly coupling the front anchor member to the rear anchor member in releasable engagement, to limit articulation of a body of the animal, sufficient to substantially preclude a head of the animal to rotate and reach portions of behind the head with a mouth of the animal.

18 Claims, 7 Drawing Sheets

RESTRAINT ASSEMBLY FOR AN ANIMAL

CROSS-REFERENCE TO RELATED APPLICATION

This application claims priority from U.S. Provisional Pat. App. Ser. No. 62/912,354 entitled "Restraint Assembly for an Animal", the entire specification of which is hereby incorporated by reference in its entirety.

This application is also a continuation-in-part of U.S. patent application Ser. No. 15/485,006, filed Apr. 11, 2017, now U.S. Pat. No. 10,653,113, entitled "Restraint Assembly for an Animal", which claims priority from U.S. Prov. Pat. App. Ser. No. 62/320,798, filed Apr. 11, 2016, entitled "Restraint System for an Animal", the entire specification of each of which is hereby incorporated by reference in its entirety.

BACKGROUND OF THE DISCLOSURE

1. Field of the Disclosure

The disclosure relates in general to a restraint assembly for an animal, and more particularly, to a restraint assembly for an animal such as a dog or the like so that the animal is precluded from reaching certain body regions with its mouth and/or tongue.

2. Background Art

The use of animal restraints is known in the art. For example, when an animal has an injury, wound or sore, there are a number of different apparatuses that can be attached to the animal to prevent the animal from reaching the wound with its mouth or tongue. One such example is the well-known cone that extends around the neck of the animal and opens outwardly on all sides of the head. Other examples include covers that cover the affected area. Still others include cylinders that prevent movement of the neck.

Unfortunately, many of these solutions are less than sufficient. An animal using the cone can become injured when the cone hits an object, or objects become lodged between the cone and the head. The cylinders and cones can often be slid down the neck of the animal (through constant wrangling) so that the snout, mouth and/or tongue can extend far enough to be able to reach the body. Moreover, many of these solutions are very uncomfortable to the animal, and can cause distress, nervous reaction and has potential for injury.

SUMMARY OF THE DISCLOSURE

The disclosure is directed to a restraint assembly for an animal, such as a dog (while not being limited thereto). The restraint assembly for an animal includes a front anchor member, a rear anchor member and a coupling assembly. The coupling assembly couples the front anchor member to the rear anchor member in releasable engagement at. A base garment can be utilized, to which the front and rear anchor members are coupled is also disclosed. In such a configuration, the front and rear anchor members generally overlie the garment, and/or are integrally coupled thereto, while it is contemplated that they may be releasably coupled, or that the anchor members may be utilized without a garment.

With more particularity, the disclosure is directed to a restraint assembly for an animal comprising a front anchor member, a rear anchor member and a coupling assembly. The front anchor member is configured to be secured to an animal through an interaction with at least one of a neck, a first front leg, and second front leg thereof. The rear anchor member is configured to be secured to an animal through interaction with at least one of a tail, a first rear leg, and a second rear leg thereof. The coupling assembly couples the front anchor member to the rear anchor member in releasable engagement, to limit articulation of a body of the animal, sufficient to substantially preclude a head of the animal to rotate and reach portions of behind the head with a mouth of the animal.

In some configurations, the front anchor member includes a first side attachment region on a first side of the front anchor member, a second side attachment region on a second side of the front anchor member and a top attachment region on a top of the front anchor member. The rear anchor member includes a first side attachment region on a first side of the rear anchor member, a second side attachment region on a second side of the rear anchor member and a top attachment region on a top of the rear anchor member. The coupling assembly further includes at least a first strap assembly coupling the first side attachment region of the front anchor member to the first side attachment region of the rear anchor member, and a second side strap assembly coupling the second side attachment region of the front anchor member to the second side attachment region of the rear anchor member.

In some configurations, the coupling assembly further includes a top strap assembly coupling the top attachment region of the front anchor member to the top attachment region of the rear anchor member.

In some configurations, at least one of the top strap assembly, the first side strap assembly and the second side strap assembly comprises a first strap coupled to one of the first anchor member and the second anchor member, a second side strap coupled to the other of the first anchor member and the second anchor member. The first strap has an attachment member proximate an end thereof. The second strap has a fastener so that the first strap and the second strap can be attached together utilizing the attachment member and the fastener, in releasable engagement.

In some configurations, at least one of the top strap assembly, the first side strap assembly and the second side strap assembly are adjustable in length through the attachment member and the fastener, so as to define an adjustable length.

In some configurations, at least one of the top strap assembly, the first side strap assembly and the second side strap assembly comprise a substantially inelastic material.

In some configurations, the coupling assembly further includes a first cross strap assembly and a second cross strap assembly. The first cross strap assembly couples the first side attachment region of the front anchor member to the second side attachment region of the rear anchor member. The second cross strap assembly couples the second side attachment region of the front anchor member to the first side attachment region of the rear anchor member.

In some configurations, the front anchor member further comprises a yolk having an opening structurally configured to receive the head of the animal therethrough, and an opening structurally configured to receive at least one foot of the animal therethrough.

In some configurations, the front anchor member further includes a fastener configured to extend along a spine of the animal, to facilitate releasable engagement and disengagement thereof from the animal. In some such configurations, the fastener comprises a zipper.

In some configurations, the rear anchor member further comprises a girdle having an opening structurally configured to receive the tail of the animal therethrough, and an opening structurally configured to receive at least one foot of the animal therethrough. In some such configurations, the rear anchor member further includes a fastener configured to extend along a spine of the animal, to facilitate releasable engagement and disengagement thereof from the animal. In some such configurations, the fastener comprises a zipper.

In some configurations, the front anchor member and the rear anchor member are separate members. In other such configurations, the front anchor member and the rear anchor member are coupled to an underlying garment so as to be coupled to each other through the underlying garment.

In some configurations, the underlying garment further comprises an elastic material.

In some configurations, the front anchor member includes a first side attachment region on a first side of the front anchor member, a second side attachment region on a second side of the front anchor member and a top attachment region on a top of the front anchor member. The rear anchor member includes a first side attachment region on a first side of the rear anchor member, a second side attachment region on a second side of the rear anchor member and a top attachment region on a top of the rear anchor member. The coupling assembly further includes at least a first cross strap assembly coupling the first side attachment region of the front anchor member to the second side attachment region of the rear anchor member, and a second cross strap assembly coupling the second side attachment region of the front anchor member to the first side attachment region of the rear anchor member.

In some such configurations, the coupling assembly further includes a top strap assembly coupling the top attachment region of the front anchor member to the top attachment region of the rear anchor member.

In another aspect of the disclosure, the disclosure is directed to a method of attaching a restraint assembly comprising the steps of: providing the restraint assembly; attaching the front anchor member to the animal; attaching the rear anchor member to the animal; coupling the coupling assembly to, in turn, attach the front anchor member to the rear anchor member; and limiting articulation of a body of the animal, sufficient to substantially preclude a head of the animal to rotate and reach portions of behind the head with a mouth of the animal.

BRIEF DESCRIPTION OF THE DRAWINGS

The disclosure will now be described with reference to the drawings wherein.

DETAILED DESCRIPTION OF THE DISCLOSURE

Figure 1:
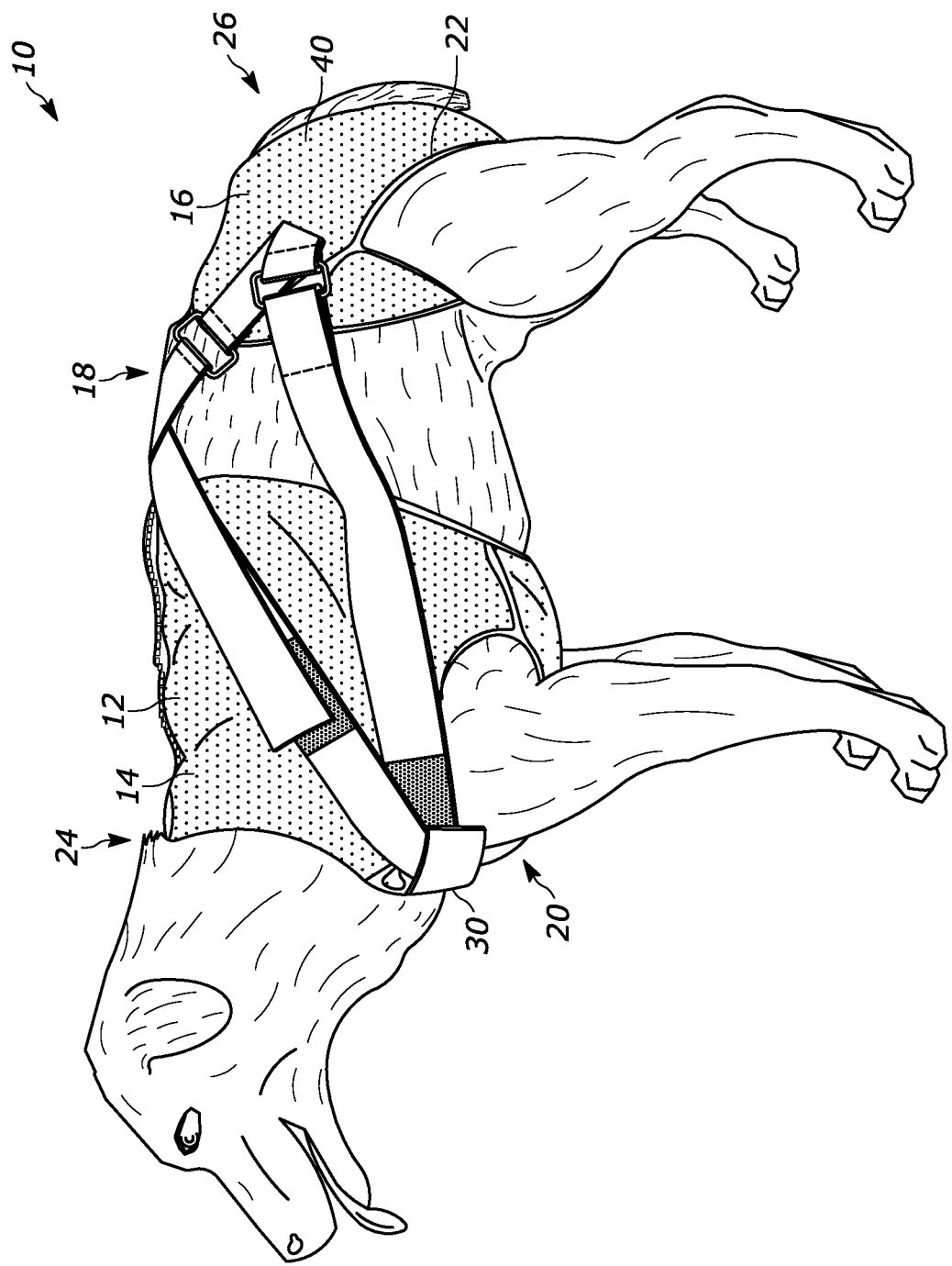
FIG. 1 of the drawings is a side view of an animal having the restraint assembly of the present disclosure fully installed, with the animal in a seated position.
Figure 2:
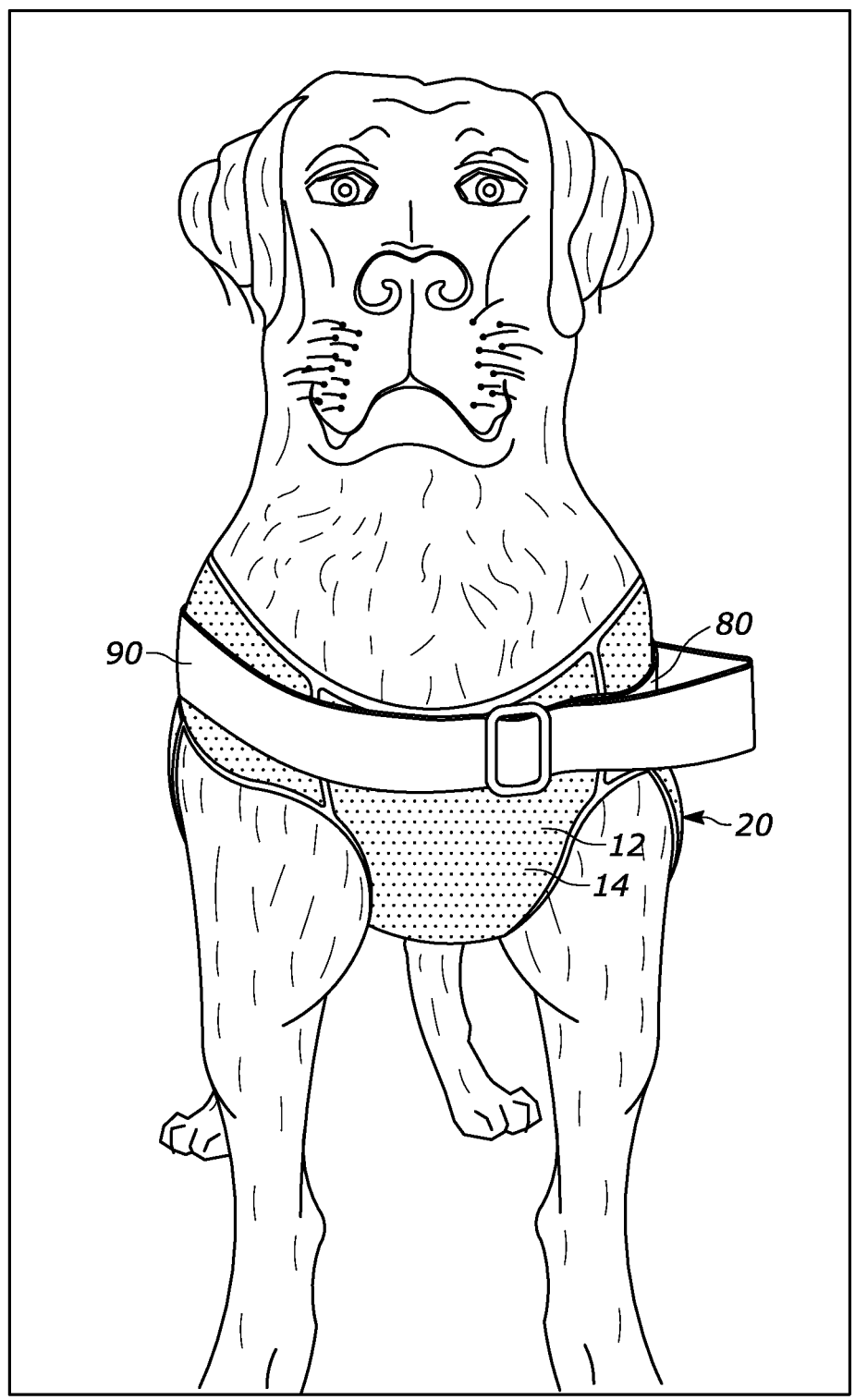
FIG. 2 of drawings is a front view of an animal having the restraint assembly of the present disclosure fully installed, with the animal in a seated position.
Figure 3:
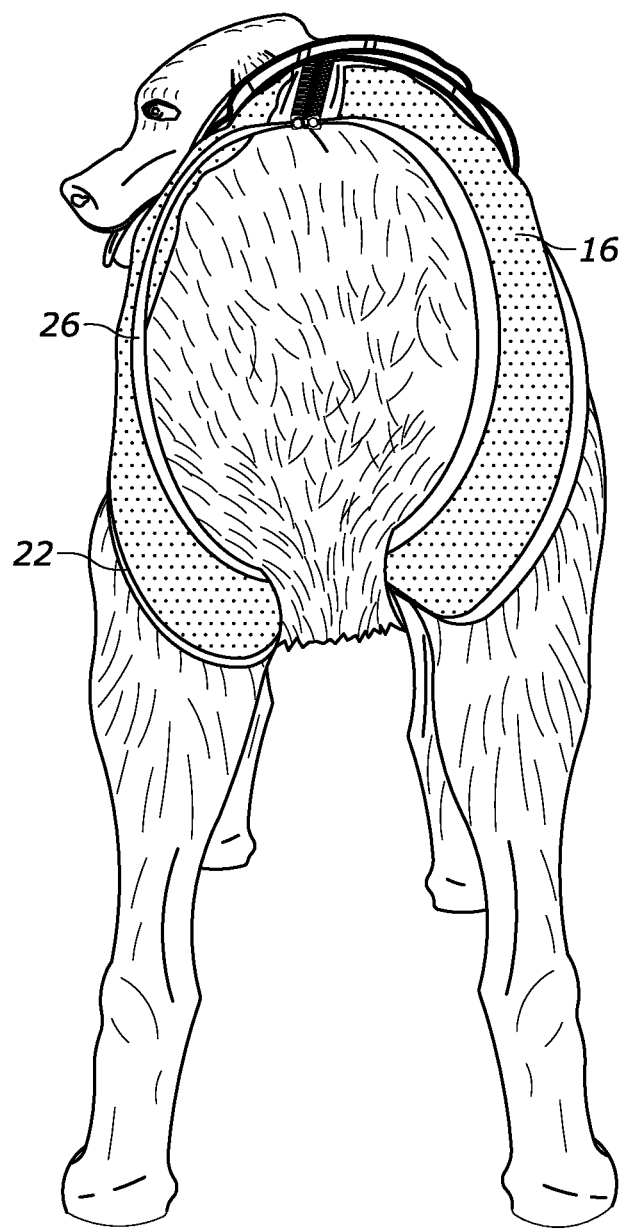
FIG. 3 of the drawings is a back view of an animal having the restraint assembly of the present disclosure fully installed, with the animal in a standing position.
Figure 4:
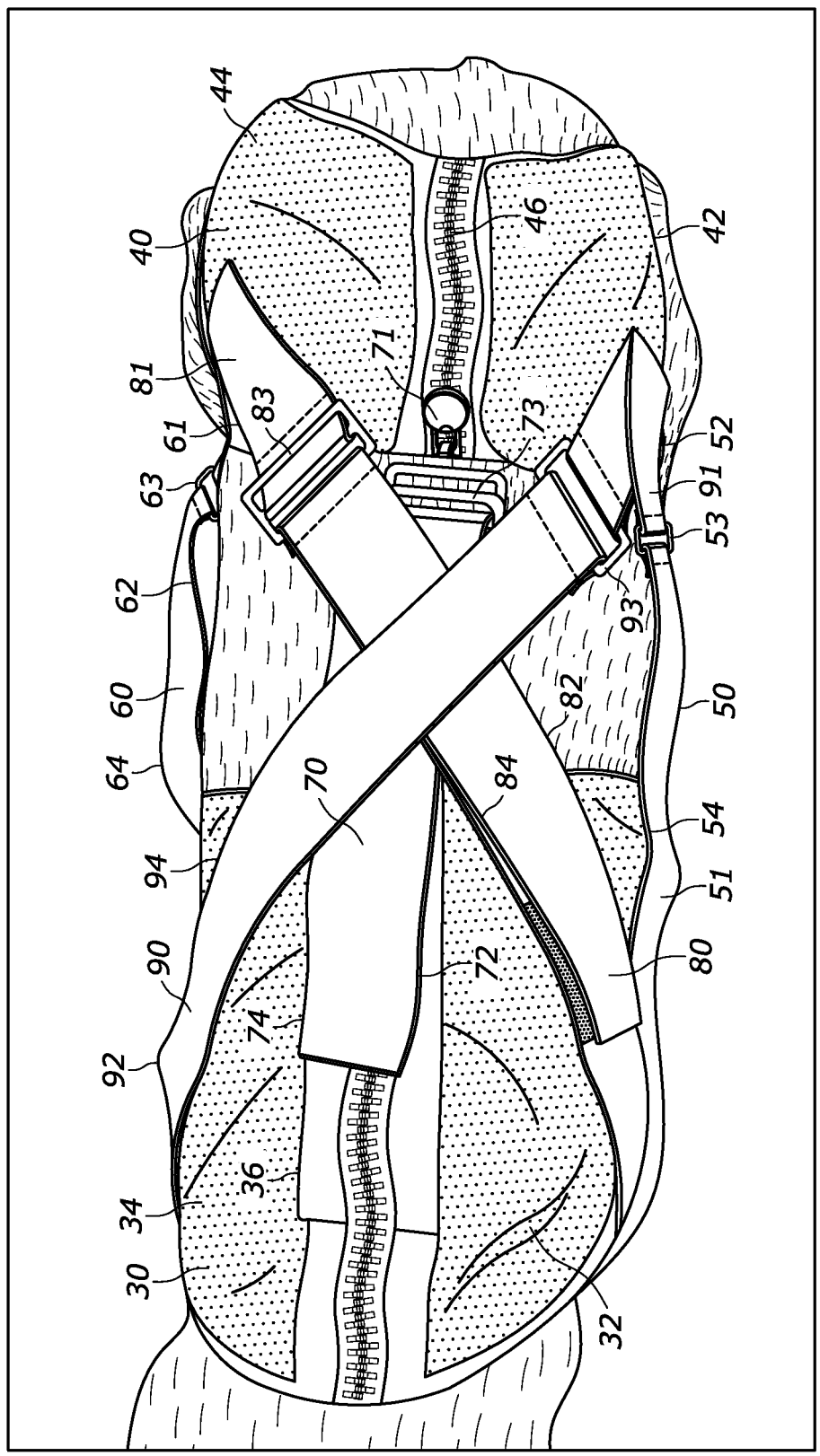
FIG. 4 of the drawings is a top view of an animal having the restraint assembly of the present disclosure fully installed, with the animal in a standing position.

While this disclosure is susceptible of embodiment in many different forms, there is shown in the drawings and described herein in detail a specific embodiment(s) with the understanding that the present disclosure is to be considered as an exemplification and is not intended to be limited to the embodiment(s) illustrated.

It will be understood that like or analogous elements and/or components, referred to herein, may be identified throughout the drawings by like reference characters. In addition, it will be understood that the drawings are merely schematic representations of the invention, and some of the components may have been distorted from actual scale for purposes of pictorial clarity.

Referring now to the drawings and in particular to FIG. 1, the restraint assembly is shown generally at 10. The restraint assembly is configured for attachment to an animal, and preferably, a four legged animal, such as a dog or the like. Of course, the restraint assembly may be utilized with other animals, such as pets, domesticated animals, wild animals and the like, and the use is not limited to dogs. The assembly will be shown in use with a dog having all four legs, with the understanding that it is not to be deemed limiting, but merely exemplary.

The restraint assembly 10 is shown as including, optionally, base garment 12 (FIG. 5), front anchor member 14, rear anchor member 16 and coupling assembly 18. It will be understood that in some configurations, it may be desirable to eliminate the base garment, relying instead on an open configuration utilizing the anchor members and the coupling assembly 18. In other configurations, the base garment may be varied to protect/cover a greater or lesser amount of the animal. In the configuration shown, the base garment includes a general covering of the animal between the neck and the tail, and much of the legs of the animal. The garment, therefore, includes front leg openings 20, back leg openings 22, neck opening 24 and tail openings 26.

Figure 5:
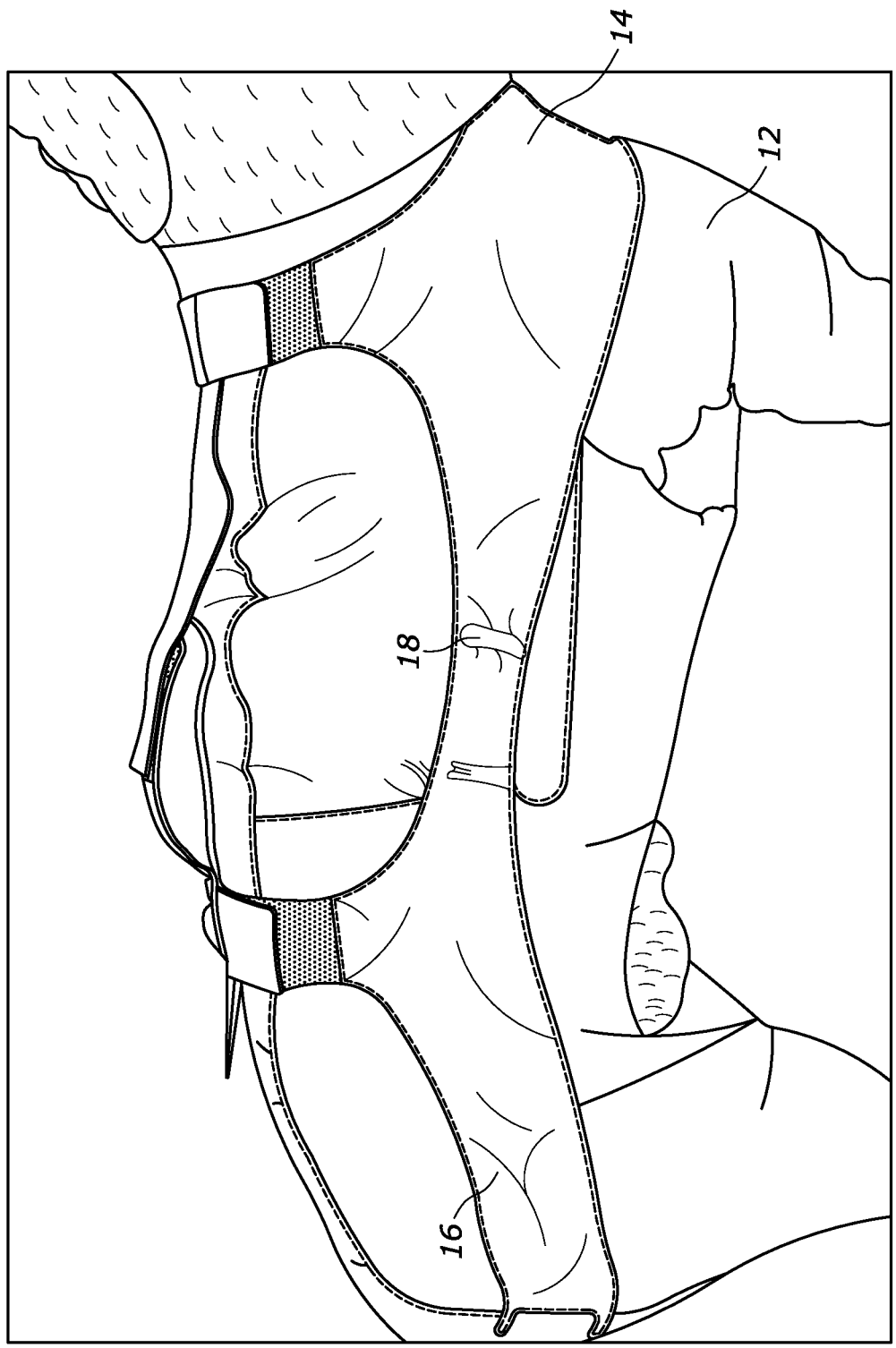
FIG. 5 of the drawings is a side view of an animal having another configuration of the restraint assembly of the present disclosure, showing, an elastic underlying garment.
Figure 6:
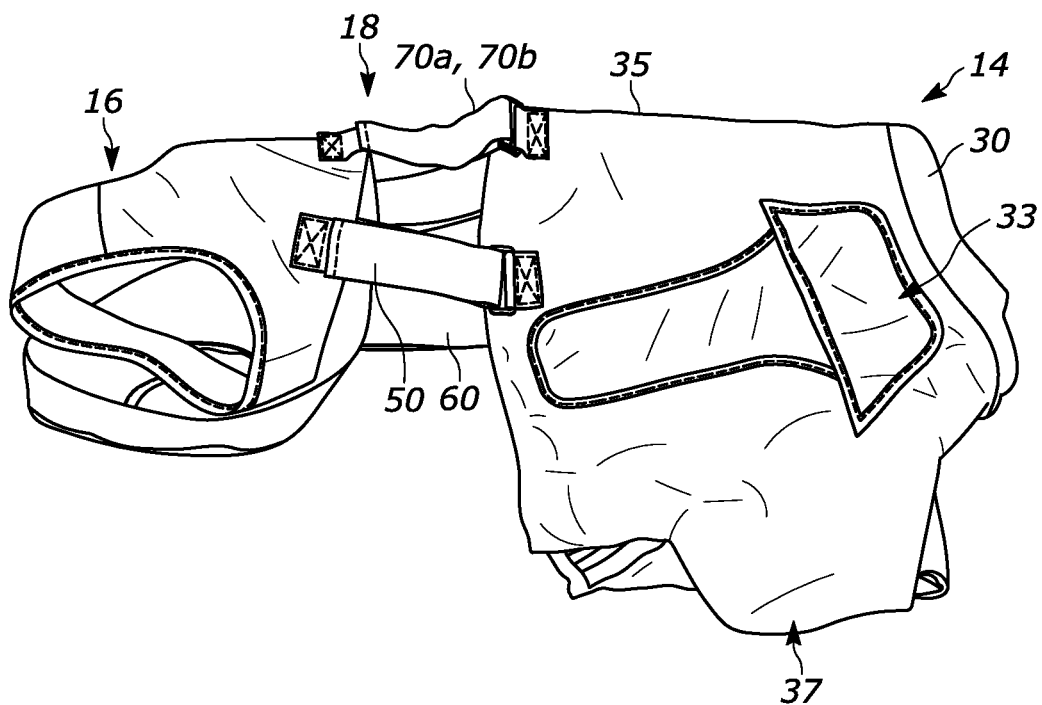
FIG. 6 of the drawings is a side view of another configuration of the restraint assembly of the present disclosure.
Figure 7:
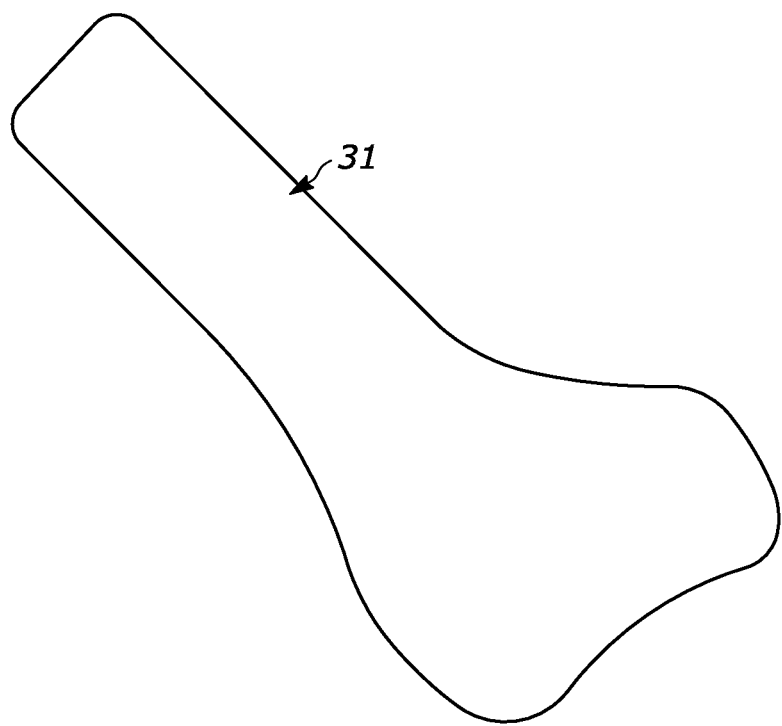
FIG. 7 of the drawings is a top plan view of the stiffener plate of the present disclosure.
Figure 8:
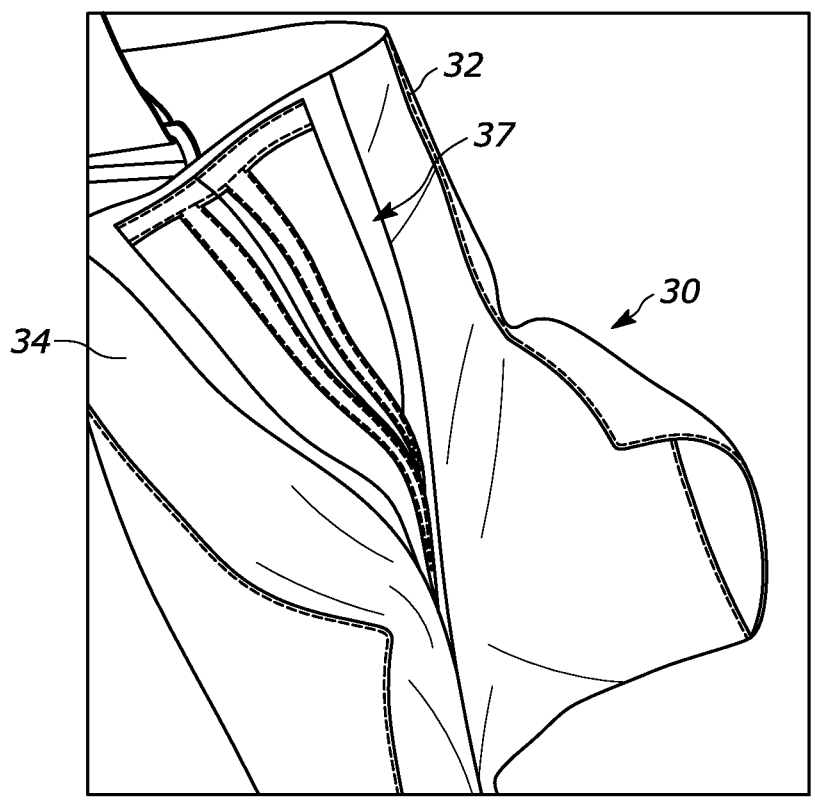
FIG. 8 of the drawings is a bottom view of the front anchor member of the restraint assembly of the present disclosure.
Figure 9:
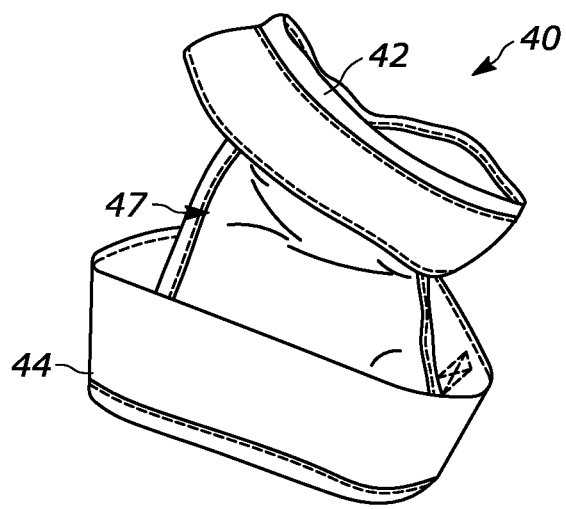
FIG. 9 of the drawings is a bottom view of the rear anchor member of the restraint assembly of the present disclosure.

With reference to FIG. 5, the base garment can be made from a number of different materials. In one configuration, the base garment can be made from an elastic material that includes anti-microbial properties. The elastic material may provide a compress and may provide compression to the body of the user. The elastic material is likewise breathable, to allow for wound healing and the like, and to maintain the animal in relative comfort. Depending on the configuration, the garment may be made from multiple separate components or sections that are sewn or otherwise attached together. It will further be understood that the certain portions of the garment may be releasably attached to itself. For example, certain portions of the garment may include an opening or a separation that can be joined through Velcro or a zipper, as well as other releasably attachable structures. It will be understood that when Velcro or the like is referenced herein, it will include all types of other fasteners, such as other hook and loop fasteners, snaps, clips, zippers, releasable adhesives, buttons, among others.

For example, in the configuration shown in FIG. 5, a single garment is contemplated, wherein the garment includes a zipper along the length of the spine of the animal. Additionally, the garment has broad coverage over the body of the animal. In other configurations, such as the configuration shown in FIGS. 1 through 4, the garment includes two components, which both form the garment and the front anchor member, and the rear anchor member. Each member is separately coupled to the animal. Additionally, each includes a zipper along corresponding to the spine of the animal to aid in the dressing and undressing of the animal. It will be understood that, in the place of zippers, other fastening structures, identified above can be utilized. It will be understood that in some configurations, additional components (in excess of two) may be utilized. It will also be understood that the garment is integrally formed with the front and rear anchor members so as to be substantially a single member. In other words, the garment may be minimized to a point, where it is really the same as the anchor members, or may be eliminated altogether.

The front anchor member 14 defines a yoke 30 that is anchored to the front of the animal. In the configuration shown, the yoke 30 is anchored around the neck of the animal. Of course, anchoring the yoke to the neck is not required, however, the neck provides a natural place to anchor the front anchor member 14, as it is proximate the head. The yoke 30 includes first side attachment region 32, second side attachment region 34 and top attachment region 36. The first and second side attachment configurations extend on opposing sides of the animal and generally along the ribs toward the hips of the animal. The top attachment region 36 extends along the spine of the animal. It will be understood that additional attachment regions may be supplied and the locations of these attachment regions can be varied to some degree.

The rear anchor member 16 defines a girdle 40 that is anchored to the back of the animal. In the configuration shown, the rear anchor member extends above the tail and then below the tail and around the back of the animal so as to preclude general movement from the rear of the animal. It will be understood that additional or other anchoring can occur around the rear legs of the animal or the back and the rear legs of the animal. The girdle includes first side attachment region 42, second side attachment region 44 and top attachment region 46. The first side attachment region 42 and the second side attachment region 44 extend on opposite sides of the animal and extend from the hip region toward the front and the ribs of the animal. The first side attachment region 42 substantially corresponds to the first side attachment region 32. The second side attachment region 44 substantially corresponds to the second side attachment region 44. The top attachment region 46 extends along the spine of the animal and substantially corresponds to the top attachment region 36.

Generally, the front and rear anchor members 14, 16 are formed from a more rigid, and generally inelastic (or slightly elastic) material. Thus, the front and rear anchor members, while comfortable to the animal, are generally dimensionally stable and location stable. These anchor members can be secured to the base garment 12 (where a base garment is utilized) through stitching, adhesion or otherwise. It is further contemplated that the base garment and the anchor members can be releasably coupled together through Velcro or the like. It will be understood that certain portions of the front and/or rear anchor may be releasably coupled to itself to assist with the placement and installation on the animal. For example, the portion extending below the tail can be coupled to the rest of the anchor member through Velcro or the like. Further, in some configurations, the garment and the front and rear anchor members may be integrally formed and coextant. In such a configuration, the two components essentially comprise the same singular component.

The coupling assembly 18 is shown as comprising first side strap assembly 50, second side strap assembly 60, top strap assembly 70, first cross strap assembly 80 and second cross strap assembly 90. The couplings essentially join, respectively, the yoke and the girdle together, each in generally adjustable and releasable engagement.

More particularly, the first side strap assembly 50 includes a first strap 51, second strap 52 and attachment member 53. The first strap 51 defines the first end of the strap assembly and the second strap 52 defines the second strap assembly. As will be understood the attachment member, essentially a buckle loop, is coupled to the first strap, and the second strap includes fastener 54 which comprises both the male and female components of a hook and loop fastener. The second strap is extended through the adjustment member and folded over itself to engage the male to the female components of the hook and loop fastener. The first strap 51 is attached to the front anchor member at the first side attachment region 32. The second strap 52 is attached to the rear anchor member at the first side attachment region 42.

Similarly, the second side strap assembly 60 includes a first strap 61, second strap 62 and attachment member 63. The first strap 61 defines the first end of the strap assembly and the second strap 62 defines the second strap assembly. As will be understood the attachment member, essentially a buckle loop, is coupled to the first strap, and the second strap includes fastener 64 which comprises both the male and female components of a hook and loop fastener. The second strap is extended through the adjustment member and folded over itself to engage the male to the female components of the hook and loop fastener. The first strap 61 is attached to the front anchor member at the second side attachment region 34. The second strap 62 is attached to the rear anchor member at the second side attachment region 44.

The top strap assembly 70 includes a first strap 71, second strap 72 and attachment member 73. The first strap 71 defines the first end of the strap assembly and the second strap 72 defines the second strap assembly. As will be understood the attachment member, essentially a buckle loop, is coupled to the first strap, and the second strap includes fastener 74 which comprises both the male and female components of a hook and loop fastener. The second strap is extended through the adjustment member and folded over itself to engage the male to the female components of the hook and loop fastener. The first strap 71 is attached to the front anchor member at the top attachment region 36. The second strap 72 is attached to the rear anchor member at the top attachment region 46.

The first cross side strap assembly 80 includes a first strap 81, second strap 82 and attachment member 83. The first strap 81 defines the first end of the strap assembly and the second strap 82 defines the second strap assembly. As will be understood the attachment member, essentially a buckle loop, is coupled to the first strap, and the second strap includes fastener 84 which comprises both the male and female components of a hook and loop fastener. The second strap is extended through the adjustment member and folded over itself to engage the male to the female components of the hook and loop fastener. The first strap 81 is attached to the front anchor member at the first side attachment region 32. The second strap 82 is attached to the rear anchor member at the second side attachment region 44.

The second cross side strap assembly 90 includes a first strap 91, second strap 92 and attachment member 93. The first strap 91 defines the first end of the strap assembly and the second strap 92 defines the second strap assembly. As will be understood the attachment member, essentially a buckle loop, is coupled to the first strap, and the second strap includes fastener 94 which comprises both the male and female components of a hook and loop fastener. The second strap is extended through the adjustment member and folded over itself to engage the male to the female components of the hook and loop fastener. The first strap 91 is attached to the front anchor member at the second side attachment region 34. The second strap 92 is attached to the rear anchor member at the first side attachment region 42.

In other configurations, other types of coupling assemblies are contemplated, such as buttons, snaps, ratcheting devices and the like to couple the two strap portions of each of the strap assemblies together, in a length adjustable manner. In other configurations, the yoke and the girdle may be attached together with adjustment (coupling assemblies) positioned where the two meet to allow for some relative adjustment. Indeed, it is further contemplated that portions of the yoke and girdle may be more elastic, and that limiting the elasticity may have the same function as coupling the assemblies together. It will also be understood that the straps may be integrally formed with the yolk and/or girdle as is shown in the configuration of FIG. 5.

Thus, by strapping all five of the attachment configurations of the yoke and the girdle together, the animal is generally maintained in a linear configuration. The animal is generally precluded from rotating or curving its body in either side direction by the opposing side strap and inwardly by the top strap. Thus, the straps cooperate to maintain the animal in a generally straight, linear configuration. It will be understood, therefore, that other straps or straps that are positioned in slightly different orientations may likewise maintain such a configuration. It will be understood that the in other configurations, the first and second cross strap assemblies may be omitted, and instead, only the first side strap assembly, the second side strap assembly and the top strap assembly may be utilized. In still other configurations, the first and second side strap assemblies may be omitted, and instead, the top strap assembly and the cross strap assemblies may be employed. It will be understood that additional straps (i.e., strap assemblies in excess of five, or straps of varying numbers in different location) are contemplated.

In operation, the base garment with the front and rear anchor members are placed on the animal in operable position. That is, the animal is essentially dressed with the base garment. In the configuration shown, the base garment comprises two separate components, namely, the front component and the rear component. In the configuration shown, the front component can be placed on the animal and, with the zipper across the top of the garment, the garment can be coupled thereto. In the configuration shown, the second strap 52, 62, 72, 82 and 92, are coupled to the appropriate regions of the front anchor member.

Similarly, the rear anchor member is mounted onto the animal. In the configuration shown, a zipper extends across the top of the garment, so as to secure the garment to the animal. In the configuration shown, the first strap 51, 61, 71, 81 and 91 are coupled to the appropriate regions on the rear anchor member.

As will be understood, the animal's head, and legs are directed through the respective openings, and the garment is positioned to allow for the rear openings to be positioned appropriately to allow the animal to both urinate and defecate. Additional openings may be provided to address particular concerns for any particular animal (amputations, outside medical devices, openings that allow for the application of medicament, structures that permit the carrying of medicament or applicators of medicament).

Once the garment is placed on the animal, the coupling assembly can be employed to attach the respective portions of the garment together. In particular, the components of each of the first side strap assembly, the second side strap assembly, the top strap assembly, the first cross strap component and the second cross strap component are attached to each other and adjusted so that when the animal is straight, the strap assemblies are relatively tight. More particularly, the strap assemblies are then adjusted so that the animal is permitted a desired degree of articulation of the body, sufficient to be comfortable, but insufficient to allow the head of the animal to rotate and reach a wound so that the wound can be licked or bit.

It will be understood that the animal is nevertheless permitted to move, walk, run, lay, sit, run, lounge, urinate and defecate as necessary and desired, without substantial impediment. Thus, the animal's comfort and dignity remains, while the animal is precluded from reaching and self-treating a wound.

It will be understood that in other configurations, some of the strap assemblies may be omitted. For example, in certain configurations, the first and second side strap assemblies may be omitted (or may be present, but not utilized). In other configurations, the first side, second side and top side strap assemblies can be utilized, and the cross strap assemblies can be omitted (or may be present, but not utilized).

In another configuration of the present disclosure, and with reference to FIGS. 6 through 9, the restraint assembly has a few modifications. First, the front yoke includes a zipper 35 (FIG. 6) as with the prior configurations at the upper end of the front anchor member. And, the front anchor member further includes a lower web 37 (FIG. 6, 8) that spans across a lower region of the front anchor member.

Similarly, the rear anchor member 16 includes a zipper 45 at the upper end thereof (FIG. 6) as with the prior configurations. Additionally, the rear anchor member further includes a lower web 47 (FIG. 6, 9) that spans across the lower region of the rear anchor member.

With both the front and rear anchor members, it has been found that utilizing an elastic material for the lower web of both the front anchor member and the rear anchor member, while the remainder of the members comprise a more rigid material (that is preferably non-elastic), comfort is provided to the animal while at the same time facilitating a proper retention of the pet within the restraint system (and not providing too much freedom to the pet).

Additionally, in the configuration shown, the front anchor member further includes a stiffener envelope 33 which is shown on one side of the garment. It will be understood that a mirror image of the stiffener envelope 33 may be presented in a similar orientation on the second side of the garment. The stiffener envelope has a pair of overlapping structures that define an enclosure. The stiffener plate 31 can be inserted into the stiffener envelope 33. The stiffener plate comprises a polymer material that is substantially rigid. In the configuration shown, the polymer comprises a substantially rigid polymer sheet of a thickness of around 1 mm. A number of different polymers, such as ABS polymers, among others are contemplated. Additionally, it will be understood that the thickness of the stiffener, as well as the shape and position can be varied to achieve a balance of comfort while precluding movement in certain directions/positions by the animal.

It will further be understood that the size and shape of the front anchor member and the rear anchor member can be varied without departing from the scope of the present disclosure.

The foregoing description merely explains and illustrates the disclosure and the disclosure is not limited thereto except insofar as the appended claims are so limited, as those skilled in the art who have the disclosure before them will be able to make modifications without departing from the scope of the disclosure.

What is claimed is:

1. A restraint assembly for an animal comprising:
a front anchor member, the front anchor member configured to be secured to an animal through an interaction with at least one of a neck, a first front leg, and second front leg thereof;
a rear anchor member, the rear anchor member configured to be secured to an animal through interaction with at least one of a tail, a first rear leg, and a second rear leg thereof;
a coupling assembly coupling the front anchor member to the rear anchor member in releasable engagement, to limit articulation of a body of the animal, sufficient to substantially preclude a head of the animal to rotate and reach portions of behind the head with a mouth of the animal;
wherein the front anchor member further includes a first stiffener plate on a first side thereof, and a second stiffener plate releasably attachable to a second side thereof, the first and second stiffener plates being rigid so as to preclude bending thereacross; and
wherein the front anchor member includes a first side and a second side, the first and second side being joined together at a top end by a zipper and joined together at the bottom end by a lower web.

2. The restraint assembly of claim 1 wherein the first stiffener plate and the second stiffener plate are removably attachable to a respective one of the first side and the second side.

3. The restraint assembly of claim 2 wherein the front anchor member further includes a first stiffener envelope positioned on the first side thereof and a second stiffener envelope positioned on the second side thereof, with the first stiffener plate being removably positionable within the first stiffener envelope and the second stiffener plate being removably positionable within the second stiffener envelope.

4. The restraint assembly of claim 1 wherein at least one of the first stiffener plate and the second stiffener plate extend from a front end to a back end thereof.

5. The restraint assembly of claim 1 wherein the first stiffener plate and the second stiffener plate comprise a rigid polymer sheet.

6. The restraint assembly of claim 1 wherein the first side and the second side of the front anchor are substantially non-elastic.

7. The restraint assembly of claim 1 wherein the first stiffener plate and the second stiffener plate comprise a polymer material that is substantially rigid.

8. A restraint assembly for an animal comprising:
a front anchor member, the front anchor member configured to be secured to an animal through an interaction with at least one of a neck, a first front leg, and second front leg thereof;
a rear anchor member, the rear anchor member configured to be secured to an animal through interaction with at least one of a tail, a first rear leg, and a second rear leg thereof;
a coupling assembly coupling the front anchor member to the rear anchor member in releasable engagement, to limit articulation of a body of the animal, sufficient to substantially preclude a head of the animal to rotate and reach portions of behind the head with a mouth of the animal;
wherein the front anchor member further includes a first stiffener plate on a first side thereof, and a second stiffener plate releasably attachable to a second side thereof, the first and second stiffener plates being rigid so as to preclude bending thereacross; and
wherein the coupling assembly comprises at least one adjustable strap extending from a first side of the front anchor member to a first side of the rear anchor member, and at least one adjustable strap extending from a second side of the front anchor member to a second side of the rear anchor member.

9. The restraint assembly of claim 8 wherein the at least one adjustable strap extending from the first side of the front anchor member comprises a pair of adjustable straps, and wherein the at least one adjustable strap extending from the second side of the front anchor member comprises a pair of adjustable straps.

10. The restraint assembly of claim 8 wherein the first side and the second side of the rear anchor are substantially non-elastic.

11. A restraint assembly for an animal comprising:
a front anchor member, the front anchor member configured to be secured to an animal through an interaction with at least one of a neck, a first front leg, and second front leg thereof;
a rear anchor member, the rear anchor member configured to be secured to an animal through interaction with at least one of a tail, a first rear leg, and a second rear leg thereof;
a coupling assembly coupling the front anchor member to the rear anchor member in releasable engagement, to limit articulation of a body of the animal, sufficient to substantially preclude a head of the animal to rotate and reach portions of behind the head with a mouth of the animal;
wherein the front anchor member further includes a first stiffener plate on a first side thereof, and a second stiffener plate releasably attachable to a second side thereof, the first and second stiffener plates being rigid so as to preclude bending thereacross; and
wherein the rear anchor member includes a first side and a second side, the first and second side being joined together at a top end by a zipper and joined together at the bottom end by a lower web.

12. A restraint assembly for an animal comprising:
a front anchor member, the front anchor member configured to be secured to an animal through an interaction with at least one of a neck, a first front leg, and second front leg thereof, the front anchor member further including a first side and a second side, with a zipper joining the first side and the second side at a top end thereof;

a rear anchor member, the rear anchor member configured to be secured to an animal through interaction with at least one of a tail, a first rear leg, and a second rear leg thereof, the rear anchor member further including a first side and a second side, with a second zipper joining the first side and the second side at a top end thereof;

a coupling assembly coupling the front anchor member to the rear anchor member in releasable engagement, to limit articulation of a body of the animal, sufficient to substantially preclude a head of the animal to rotate and reach portions of behind the head with a mouth of the animal, the coupling assembly comprising at least one adjustable strap extending between the first side of the front anchor member and the first side of the rear anchor member and at least one adjustable strap extending between the second side of the front anchor member and the second side of the rear anchor member.

13. The restraint assembly of claim 12 further comprising:

a lower web extending between the first side and the second side of the front anchor member at a lower end thereof; and a lower web extending between the first side and the second side of the rear anchor member at a lower end thereof.

14. The restraint assembly of claim 13 wherein the first side and the second side of the front anchor member are inelastic with the lower web of the front anchor member being elastic.

15. The restraint assembly of claim 13 wherein the first side and the second side of the rear anchor member are inelastic with the lower web of the rear anchor member being elastic.

16. The restraint assembly of claim 12 wherein the front anchor member further includes a first stiffener plate on the first side thereof, and a second stiffener plate releasably attachable to the second side thereof, the first and second stiffener plates being rigid so as to preclude bending thereacross.

17. The restraint assembly of claim 16 wherein the first stiffener plate and the second stiffener plate are removably attachable to a respective one of the first side and the second side.

18. The restraint assembly of claim 17 wherein the front anchor member further includes a first stiffener envelope positioned on the first side thereof and a second stiffener envelope positioned on the second side thereof, with the first stiffener plate being removably positionable within the first stiffener envelope and the second stiffener plate being removably positionable within the second stiffener envelope.

* * * * *